(12) United States Patent
Washburn

(10) Patent No.: US 7,093,414 B2
(45) Date of Patent: Aug. 22, 2006

(54) ARTICULATED MOWER FOR MOWING AROUND FENCEPOSTS AND OTHER UPRIGHT OBSTRUCTIONS

(76) Inventor: Alan F. Washburn, 850 NW. 20th Rd., Lamar, MO (US) 64759

( * ) Notice: Subject to any disclaimer, the term of this patent is extended or adjusted under 35 U.S.C. 154(b) by 0 days.

(21) Appl. No.: 10/814,009

(22) Filed: Mar. 31, 2004

(65) Prior Publication Data

US 2004/0182058 A1    Sep. 23, 2004

Related U.S. Application Data

(63) Continuation of application No. 10/046,886, filed on Jan. 15, 2002, now Pat. No. 6,804,941.

(51) Int. Cl.
*A01D 34/03* (2006.01)
(52) U.S. Cl. .................................. 56/14.9
(58) Field of Classification Search ............. 56/10.4, 56/14.7, 14.9, 15.1, 15.2, 15.3, DIG. 3, DIG. 15
See application file for complete search history.

(56) References Cited

U.S. PATENT DOCUMENTS

| 2,791,081 | A | * | 5/1957 | Allen et al. ............... 56/15.7 |
| 2,898,725 | A | | 8/1959 | Roesel |
| 3,003,299 | A | * | 10/1961 | Smith et al. ............... 56/15.7 |
| 3,183,651 | A | | 5/1965 | Hoefler |
| 3,221,482 | A | * | 12/1965 | Cowling ..................... 56/15.8 |
| 3,261,150 | A | | 7/1966 | Fitzgerald, Sr. |
| 3,397,521 | A | * | 8/1968 | Danuser ...................... 56/11.9 |
| 3,498,036 | A | * | 3/1970 | Cowling et al. ............ 56/11.9 |
| 3,665,685 | A | | 5/1972 | Allard |
| 3,797,029 | A | * | 3/1974 | Sorimachi et al. .......... 396/213 |
| 4,104,851 | A | * | 8/1978 | Perry ........................... 56/10.4 |
| 4,697,405 | A | | 10/1987 | DeWitt et al. |
| 5,035,107 | A | * | 7/1991 | Scarborough ............... 56/10.4 |
| 6,804,941 | B1 | * | 10/2004 | Washburn .................... 56/10.4 |

FOREIGN PATENT DOCUMENTS

NL    GB966347    1/1963

\* cited by examiner

*Primary Examiner*—Thomas B. Will
*Assistant Examiner*—Alicia Torres
(74) *Attorney, Agent, or Firm*—Hovey Williams LLP

(57) ABSTRACT

A pull-behind mower for cutting ground vegetation. The mower generally includes a rolling frame and a mowing deck. The deck is independently articulatable relative to the frame on two distinct pivot axes.

17 Claims, 5 Drawing Sheets

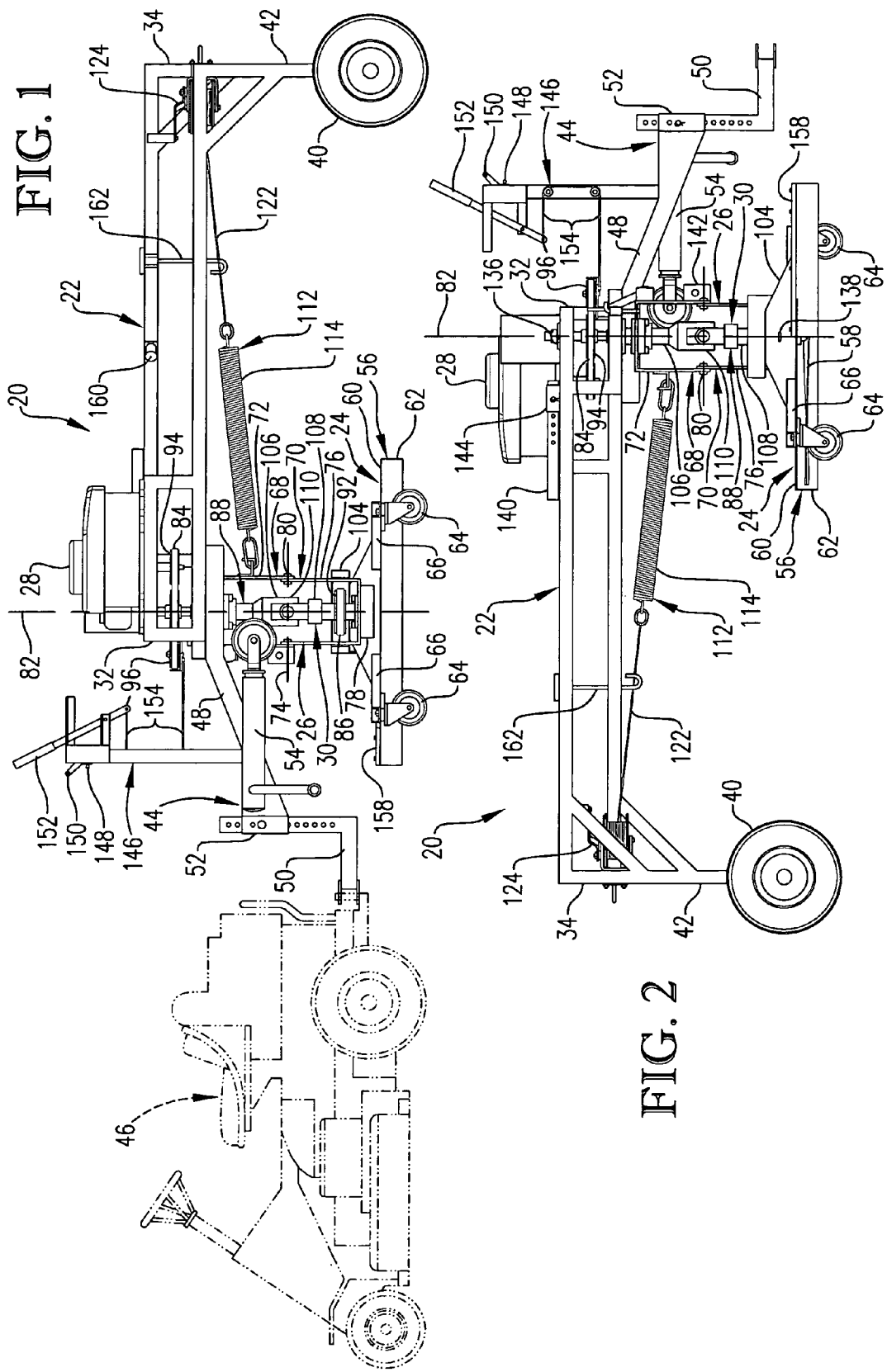

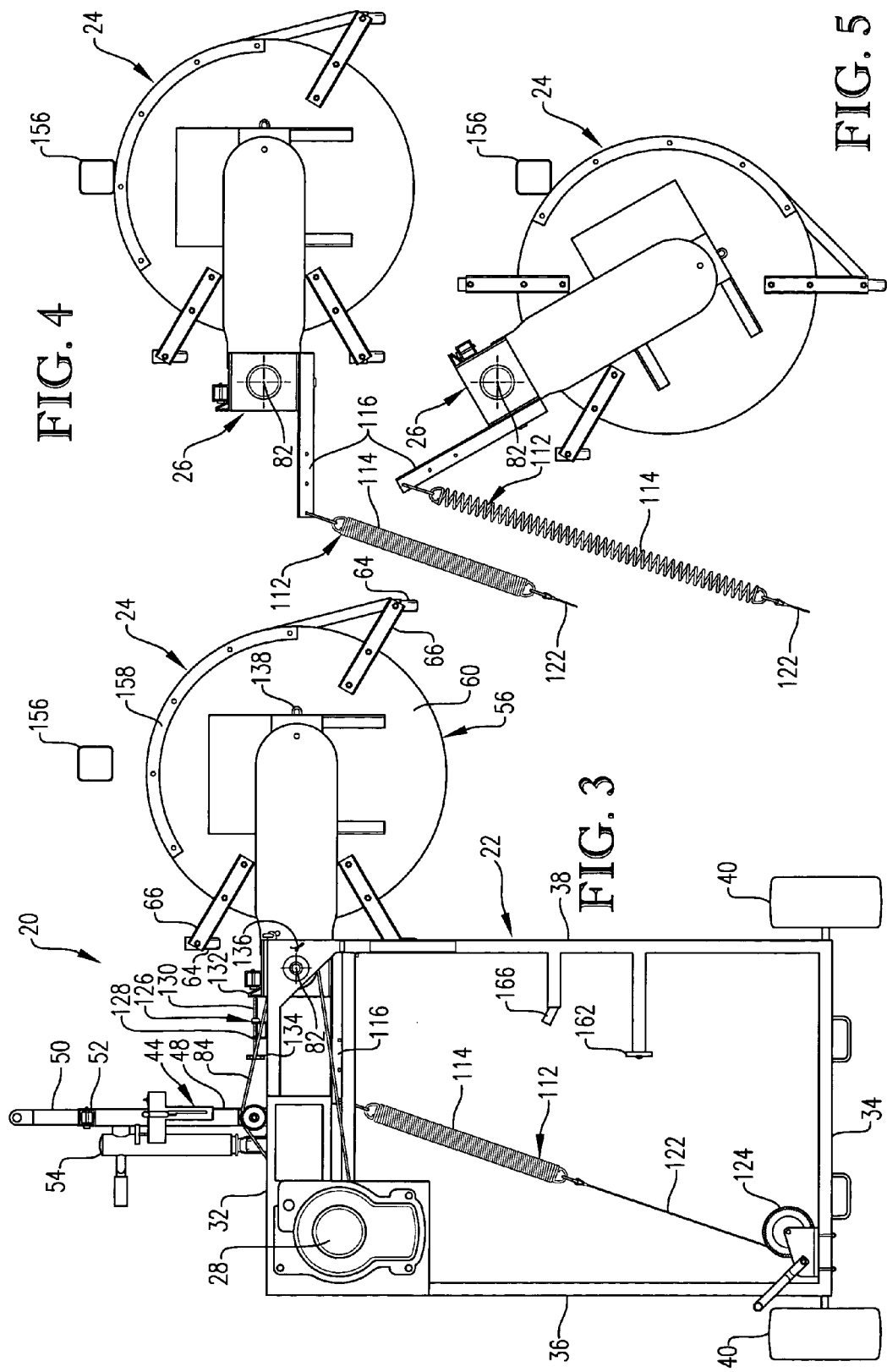

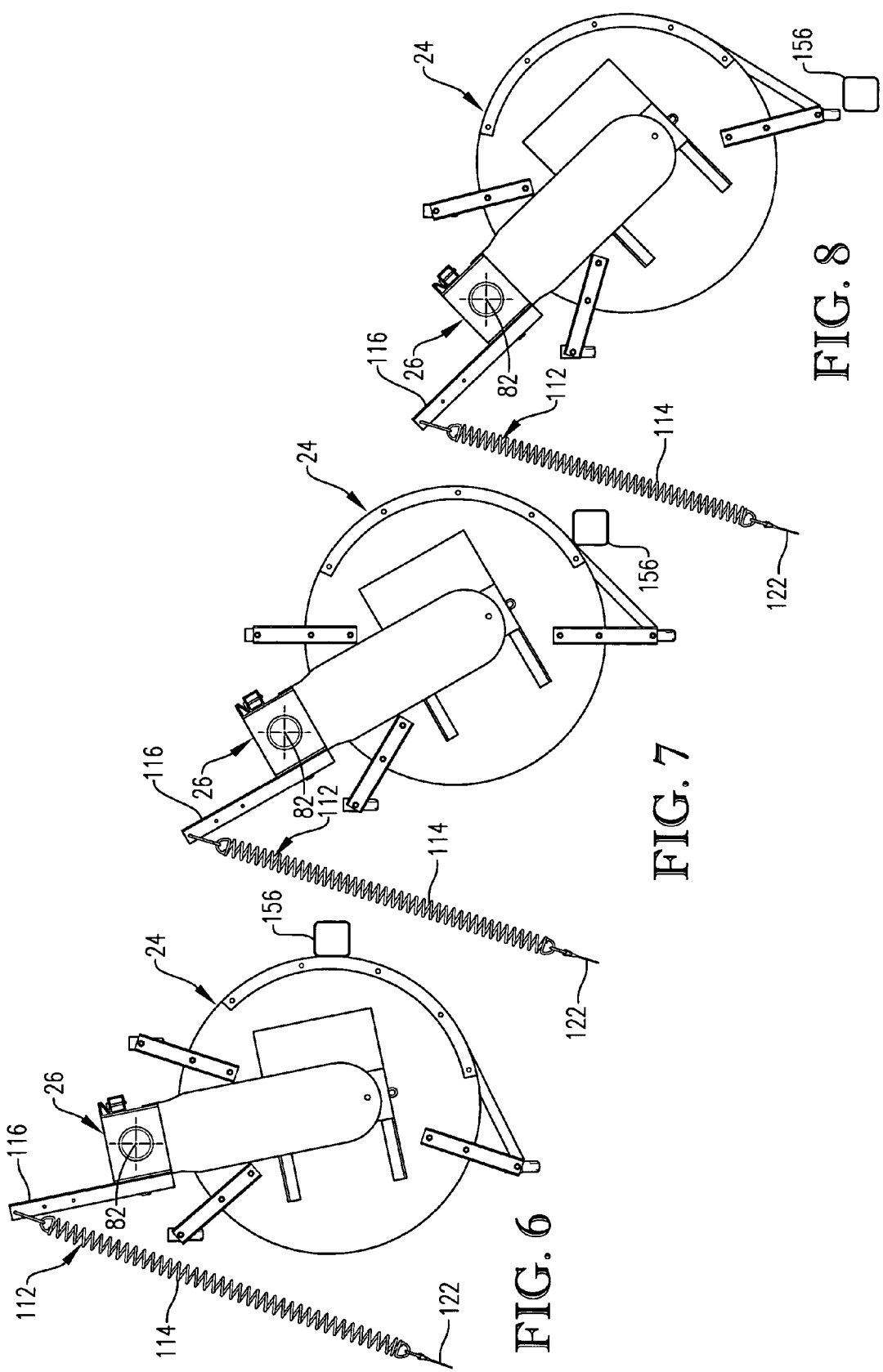

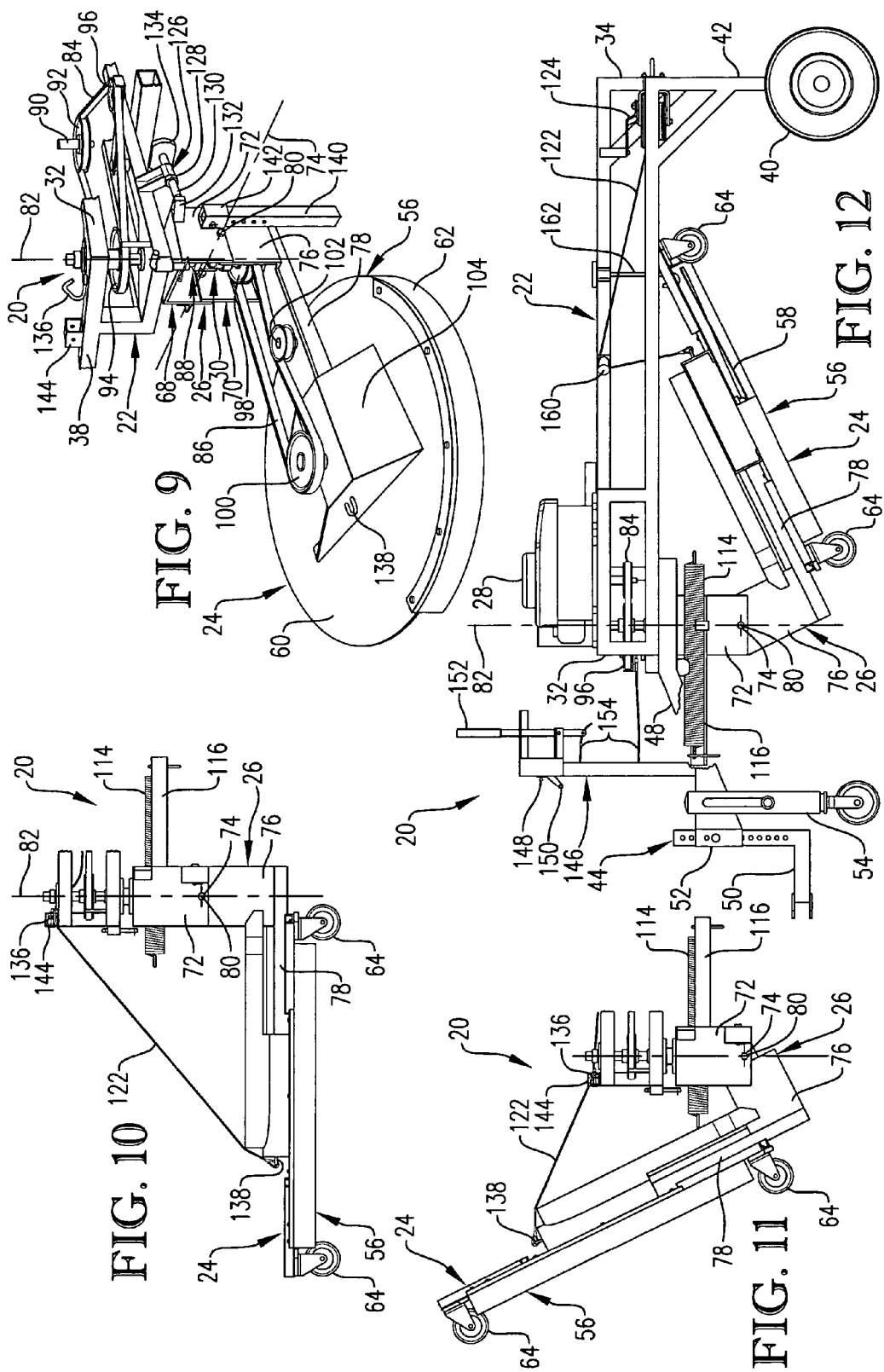

ARTICULATED MOWER FOR MOWING AROUND FENCEPOSTS AND OTHER UPRIGHT OBSTRUCTIONS

RELATED APPLICATIONS

This is a continuation of application Ser. No. 10/046,886, filed Jan. 15, 2002, now U.S. Pat. No. 6,804,941 entitled ARTICULATED MOWER FOR MOWING AROUND FENCEPOSTS AND OTHER UPRIGHT OBSTRUCTIONS, the entire disclosure of which is hereby incorporated by reference.

BACKGROUND OF THE INVENTION

1. Field of the Invention

The present invention relates generally to mowers for cutting ground vegetation. In another aspect, the invention concerns mowers having an articulatable mowing deck for allows for efficacious cutting of ground vegetation from around upright obstructions such as trees and fenceposts.

2. Description of the Prior Art

Conventional mowers for cutting ground vegetation come in a variety of configurations. However, when cutting ground vegetation around upright obstructions (e.g., trees and fenceposts), most conventional mowers require manipulation of the entire mower to effectively cut around the obstructions. As such, frequent manipulation of the entire mower can be required when mowing along a fence line or a line of trees. Particularly with large mowers, such manipulation around upright obstructions can be difficult and slows down the mowing process. Further, the mower and/or the upright obstruction may be damaged if the deck of the mower 20 accidentally strikes the obstruction. Thus, there exists a need for a mower having a mowing deck, which can cut ground vegetation around upright obstructions without requiring manipulation of the entire mower.

In response to this need, several prior art mowers have been developed having mowing decks which are independently articulatable relative to the frame of the mower. Such independently articulatable mowing decks allows for the cutting of vegetation around upright obstructions with minimal manipulation of the entire mower. However, conventional mowers having independently articulatable mowing decks have a number of drawbacks. For example, many conventional mowers having independently articulatable decks are self-propelled riding mowers having bulky and expensive designs. Further, such self-propelled riding motors can be difficult and expensive to transport over large distances due to their shear size and weight.

Some conventional mowers having independently articulatable mowing decks are not self-propelled and are designed to be pulled behind a towing vehicle. Most of these "pullbehind" mowers are not independently powered and require power to be transferred from the towing vehicle to the mower (e.g., via a hydraulic or power-take-off system) in order to rotate the blades of the mower. Thus, conventional pull-behind mowers which are not independently powered can only be used with certain types of towing vehicles having the appropriate powering mechanisms.

An additional disadvantage of conventional mowers is the inaccessibility of the underside of the mowing deck. It is important that the underside of the mowing deck be readily accessible in order to safely clean the deck and sharpen the blades.

A further disadvantage of conventional mowers having independently articulatable decks designed to extend under the wires of a fence and mow along a fence line is that the excessive width of the mower can make it difficult and/or expensive to transport and store the mower.

SUMMARY OF THE INVENTION

It is therefore an object of the present invention to provide a pull-behind mower having an independently articulatable deck which facilitates mowing around upright obstructions.

Another object of the invention is to provide a pull-behind mower that is powered independently from the vehicle towing the mower.

A further object of the present invention is to provide a pull-behind mower having an independently articulatable deck which can be pivoted upwards relative to the supporting frame to allow easy access to the underside of the deck.

A further object of the present invention is to provide a pull-behind mower having an outwardly extending, independently articulatable deck which can be shifted and locked into a retracted position, thereby decreasing the overall width of the mower during storage and/or transportation.

It should be noted that the above-listed objects need not all be accomplished by the invention claimed herein and further objects and advantages of the present invention will be apparent from the written description of the invention and the drawing figures. In accordance with one embodiment of the present invention, a pull-behind mower for cutting ground vegetation is provided. The pull-behind mower generally comprises a frame, a hitch, a pair of laterally spaced wheels, and a mowing deck. The frame presents a fore end, an aft end, and a pair of laterally spaced sides. The hitch assembly is coupled to the frame proximate the fore end and is adapted to couple the frame to a towing vehicle. The wheels are coupled to the frame proximate the aft end and are adapted to rollingly support the frame on the ground. The mowing deck is pivotally coupled to the frame proximate the fore end and is operable to cut the vegetation when positioned proximate the ground. The mowing deck is pivotable relative to the frame between a retracted position, wherein the deck is position primarily between the laterally spaced sides, and an extended position, wherein the deck is positioned primarily outside the laterally spaced sides.

In accordance with another embodiment of the present invention, a pull-behind mower for cutting ground vegetation is provided. The mower generally comprises~a motor, a mowing deck, and a drive train. The frame is adapted to be coupled to a vehicle and rollingly supported on the ground. The motor is coupled to the frame. The mowing deck is coupled to the frame for pivotal movement relative to the frame on first and second intersecting pivot axes.

The drive train drivingly couples the motor to the deck so that the motor powers the deck. The drive train includes a U-joint that is centered proximate the inner section of the pivot axes.

In accordance with a further embodiment of the present invention, a pull-behind mower for cutting ground vegetation is provided. The mower generally comprises a frame, a motor, a mowing deck and a drive train. The frame is adapted to be coupled to a vehicle and rollingly supported on the ground. The mowing deck is coupled to the frame and operable to cut the vegetation when the deck is in The deck is pivotable relative to the frame on first and second pivot axes. The deck is selectively pivotal on the second pivot axis between the engaged position and a disengaged position, wherein the deck is pivoted upward away from the ground. The deck is lockable in the disengaged position.

BRIEF DESCRIPTION OF THE DRAWINGS

A preferred embodiment of the present invention is described herein with reference to the drawing figures, wherein:

FIG. 1 is a left side view of a pull-behind mower constructed in accordance with the 30 principles of the present invention, particularly illustrating the manner in which the mower is coupled to a towing vehicle (shown in phantom) and showing the mowing deck in an extended and engaged position for cutting ground vegetation;

FIG. 2 is a right side view of the pull-behind mower shown in FIG. 1;

FIG. 3 is a top view of the pull-behind mower, particularly illustrating the mowing deck in the extended and engaged position for cutting ground vegetation;

FIG. 4 is a top view of the mowing deck and biasing assembly, particularly illustrating the mowing deck in an extended position when the deck initially contacts an upright obstruction;

FIG. 5 is a top view of the mowing deck and biasing assembly similar to FIG. 4, particularly illustrating the mowing deck in a partially retracted position when the mowing deck is forced rearward by the upright obstruction;

FIG. 6 is a top view of the mowing deck and biasing assembly similar to FIG. 4, particularly illustrating the mowing deck in a partially retracted position when the upright obstruction causes further retraction of the deck;

FIG. 7 is a top view of the mowing deck and biasing assembly similar to FIG. 4, 15 particularly illustrating the mowing deck in a partially retracted position but beginning to shift forward towards the extended position;

FIG. 8 is a top view of the mowing deck and biasing assembly similar to FIG. 4, particularly illustrating the mowing deck disengage from the upright obstruction and ready to be shifted forward into the extended position by the biasing mechanism;

FIG. 9 is an isometric view of the front right portion of the pull-behind mower, particularly illustrating the drive train for transferring power from the motor to the mowing deck;

FIG. 10 is a front view of the pull-behind mower showing the mowing deck in an extended and engaged position for cutting ground vegetation;

FIG. 11 is a front view of the pull-behind mower similar to FIG. 10, particularly showing 25 the mowing deck in an extended and disengaged position for accessing the underside of the deck;

FIG. 12 is a left side view of the pull-behind mower showing the mowing deck in the fully retracted and stored position, particularly illustrating the position of the biasing mechanism;

DETAILED DESCRIPTION OF THE PREFERRED EMBODIMENT

Figure 13:
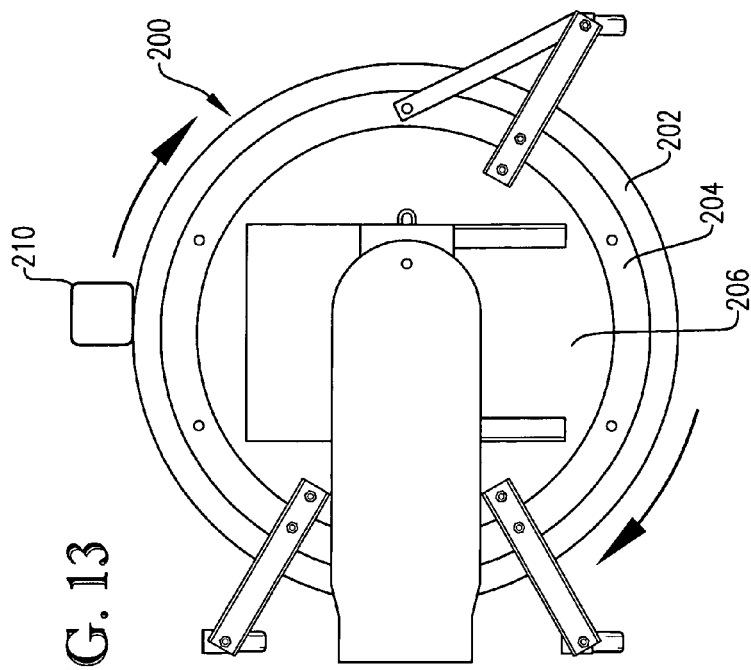
FIG. 13 is a top view of an alternative mowing deck, particularly illustrating an outer ring which is rotatable relative to the body of the mowing deck.

Referring initially to FIG. 1, a pull-behind mower 20 constructed in accordance with the principles of the present invention is illustrated as generally comprising a frame 22, a mowing deck 24, an arm assembly 26, a motor 28, and a drive train 30.

Referring to FIGS. 1 and 3, frame 22 is generally rectangular in shape (as shown in FIG. 3) and includes a fore end 32, an aft end 34, a left side 36, and a right side 38, with left and right sides 36, 38 being laterally spaced from one another. A pair of laterally spaced wheels 40 are coupled to frame 22 proximate aft end 34 via a pair of upright legs 42. Wheels 40 allow mower 20 to be rollingly supported on the ground. A hitch assembly 44 provides a means for releasably coupling frame 22 to a towing vehicle 46 (shown in phantom in FIG. 1) so that towing vehicle 46 can provide for locomotion of mower 20 on the ground.

Hitch assembly 44 generally comprises a neck member 48 and a coupling member 50 which are shiftably intercoupled via a height adjustment mechanism 52. Neck member 48 is rigidly coupled to frame 22 proximate fore end 32, while coupling member 50 is adapted to releasably coupled to the hitch of towing vehicle 46. Height adjusting mechanism 52 the height of hitch assembly 44 to be adjusted so that mower 20 can be coupled to a wide variety of types of towing vehicles. A shown in FIG. 12, a jack 54 is preferably coupled to neck member 48 and is operable to support fore end 32 of mower 20 on the ground when mower 20 is not coupled to a towing vehicle.

Referring to FIG. 1–3 and 9, mowing deck 24 is coupled to frame 22 proximate fore end 32 and right side 38 via arm assembly 26. Mowing deck 24 includes a blade housing 56 and one or more blades 58 received in blade housing 56. Blade housing 56 comprises a generally flat upper plate 60 and a side skirt 62. Blades 58 include a sharpened edge and are adapted to rotate at high speeds relative to housing 56 so that blades 58 can cut ground vegetation when contacted therewith. Deck 24 is preferably adapted to be at least partly rollingly supported on the ground via a plurality of casters 64. As shown in FIG. 3, three casters 64 are preferably coupled to upper plate 60 of blade housing 56 via wheel supports 66.

Arm assembly 26 generally includes a frame-side section 68 rotatably coupled to frame 22 proximate fore end 32 and left side 36 and a deck-side section 70 rigidly coupled to deck 24. Frame-side section 68 generally includes a pair of spaced-apart upper plates 72 that are rotatably coupled to frame 22 to thereby allow for rotation of arm assembly 26 relative to frame 22 on a first, generally upright, pivot axis 82. Deck-side section 70 generally includes a pair of spaced-apart lower plates 76 which are rigidly coupled to a lateral member 78. Upper plate 72 and lower plate 76 are preferably hingedly coupled to one another via a hinge joint 80 to thereby allow deck-side section 70 of arm assembly 26 to pivot relative to frame-side section 68 of arm assembly 26 on a second pivot axis 82. First and second pivot axes 74, 82 preferably intersect one another and extend at least substantially perpendicular to one another. Thus, arm assembly 26 provides for pivotal movement of deck 24 relative to frame 22 on two distinct pivot axes 74, 82.

Motor 28 is rigidly coupled to frame 22 proximate fore end 32 and left side 36. Motor 10 28 is preferably a conventional gas-powered engine having sufficient power to rotate blades of deck 24 to thereby cut ground vegetation. A drive train 30 drivingly couples motor 28 to blades 58 of deck 24. Drive train 30 generally includes an upper drive belt 84, a lower drive belt 86, and a drive shaft 88. Referring to FIG. 9, an output shaft 90 and output sheave 92 are rotated by motor 28, thereby driving upper drive belt 84. Upper drive 84 can cause an upper drive sheave 94 to rotate when a clutch sheave 96 is shifted to create sufficient tension in upper drive belt 84. Upper drive sheave 94 causes rotation of drive shaft 88, which in turn causes rotation of a lower drive sheave 98. The rotation of lower drive sheave 98 drives lower drive belt 86, a thereby rotating a blade sheave 100.

Blade sheave 100 is coupled to blade 58 so that rotation of blade sheave 100 causes rotation of blade 58 relative to blade housing 56. An adjustable idler sheave 102 allows the tension and lower belt 86 to be properly adjusted and maintained. Although not shown in FIG. 9, a belt guard 104 (shown in FIG. 2) is preferably positioned over lower drive belt 86, blade sheave 100, and idler sheave 102 for safety purposes.

Referring to FIGS. 1–2 and 9, drive shaft 88 generally includes an upper element 106 coupled to upper drive sheave 94, a lower element 108 coupled to lower drive sheave 98, and a universal joint (U-joint) 110 pivotally coupling upper and lower elements 106, 108 of drive shaft 88. U-joint 110 generally extends between upper plates 72 of arm assembly 26 and lower plates 76 of arm assembly 26 so that the pivotal center of U-joint 110 is located proximate the intersection of first and second pivot axes 74, 82. Thus, U-joint 110 allows motor 28 to drive blades 58 of deck 24 even while deck 24 is being pivoted relative to frame 22 on first and second 30 pivot axes 74, 82.

A biasing mechanism 112 is coupled to arm assembly 26 and biases mowing deck 24 towards the extended position (shown in FIG. 3) wherein deck 24 extends laterally from right side 38. Biasing mechanism 112 generally includes a spring 114 which is coupled to a torque element 116. Torque element 116 is rigidly coupled to arm assembly 26 at a proximal end of torque element 116. Torque element 116 extends from its proximal end generally away from first pivot axes 74. Spring 114 is coupled between a distal end of torque element 116 and frame 22 so that rotation of arm assembly 26 and deck 24 on first pivot axis 74 towards the retracted position causes spring 114 to stretch. Spring 114 is releasably coupled to frame 22 via a cable 122 and a winch 124. Winch 124 allows the tension of spring 114 to be adjusted to the desired level.

Referring to FIGS. 3 and 9, an adjustable stop mechanism 126 cooperates with frame 22 and arm assembly 26 to prevent deck 24 from swinging forward past the extended position (shown in FIG. 3). Stop mechanism 126 generally includes a threaded nut 128 rigidly coupled to frame 22, a threaded rod 130 threadably intercoupled with nut 128, and a contact plate 132 rigidly coupled to and extending from arm assembly 26. When deck 24 is in the extended position (shown in FIG. 3), rod 130 contacts contact plate 132 to prevent forward movement of deck 24 relative to frame 22 past the extended position. A handle 134 is coupled to rod 130 so that rod 130 can be rotated in nut 128 to thereby adjust the angle between deck 24 and frame 22 when deck 24 is in the extended position.

Referring to FIGS. 3 and 10–11, a cable guide 136 is rigidly coupled to frame 22 proximate 20 fore end 32 and right side 38. When cable 122 is not being used to connect spring 114 to frame 22, cable 12 can be threaded through cable guide 136 and coupled to a cable anchor 138 rigidly coupled to deck 24. Referring to FIGS. 10 and 11, when coupled to cable anchor 138, cable 122 can be used to pivot deck 24 relative to frame 22 on second pivot axis 82 between an engaged position (shown in FIG. 10) and a disengaged position (shown in FIG. 11). When in the engaged position, deck 24 is adapted to be positioned proximate the surface of the ground and at least partly supported on the ground by casters 64. When in the disengaged position, deck 24 is pivoted generally upwards from the engaged position with casters 64 being moved out of contact with the ground to thereby provide access to the underside of deck 24. Winch 124 (shown in FIG. 3) can be used to shift deck 24 between the engaged and disengaged position when cable 122 is detached from spring 114. Referring to FIG. 9, it may be necessary to employ a removable support leg 140 when the deck is the disengaged position in order to restrain tipping of frame 22. Support leg 140 can be shifted between a supporting position wherein leg 140 is received in a support sleeve 142 and a storage position wherein leg 140 is received in storage sleeve 144. Referring again to FIGS. 10 and 11, when cable 122 is decoupled from spring 114, a stop pin 145 can be lowered to prevent deck 24 from retracting rearward while deck 24 is in the disengaged position. Referring to FIGS. 10–12, when cable 122 is detached from spring 114, spring 114 can be received in and supported by torque element 116.

Referring to FIGS. 1–2, the operation of mower 20 can be at least partly controlled by manipulating the components of a control stand 146. Control stand 146 generally includes an ignition switch 148 for starting and stopping motor 28, a throttle 150 for controlling the speed of motor 28, and a clutch lever 152 for engaging and disengaging a motor 28 and drive train 30. A clutch line 154 is coupled to and extends between clutch lever 152 and clutch sleeve 96. When clutch lever 152 is shifted, clutch line 154 causes clutch sheave 96 to shift relative to frame 22, thereby varying the tension in upper drive belt 84 to engage and disengage drive train 30. In operation, mower 20 can be employed to mow ground vegetation when deck 24 is in the engaged (i.e., lowered) position and biasing mechanism 112 is employed to bias deck 24 towards the extended position (shown in FIG. 3). In FIGS. 3–8, deck 24 and biasing mechanism 112 are illustrated in different positions as mower 20 mows around an upright obstruction 156. FIG. 5 shows mower 20 as it approaches upright obstruction 156 with deck 24 extending outwardly from right side 36 in its fully extended position. FIG. 4 shows deck 24 as it initially 20 contacts upright obstruction 156. A synthetic resin tree guard 158 is preferably coupled to deck 24 to prevent the outer edge of deck 24 from cutting into and damaging upright obstruction 156 (especially when upright obstruction 156 is a tree). FIG. 5 shows deck 24 being forced rearwardly into a partially retracted position as mower 20 continues to move past upright obstruction 156. FIGS. 6 and 7 show the incremental positions of deck 24 relative to upright obstruction 156 as 25 mower 20 moves further past upright obstruction 156. FIG. 8 shows deck 24 as it moves out of contact with upright obstruction 156 and is ready to be shifted into the fully extended position by biasing mechanism 112.

Referring to FIGS. 3,9 and 10–11, when mowing is terminated and access to the underside of deck 24 is desired (e.g., to clean the deck or remove the blades), cable 122 can be decoupled from torque element 160, threaded through cable guide 136, and coupled to cable anchor 138. Support leg 140 can then be removed from storage sleeve 144 and placed in support sleeve 142 to support the fore end 32 and right side 28 of frame 22 on the ground. Winch 124 can then be used to retract cable 122, thereby pivoting deck 24 upwards on second pivot axis 82 into the disengaged position. It is preferred for deck 24 to be pivotable relative to frame 22 on second pivot axis 82 through a second pivot angle of more than about 30°, more preferably more than about 45°.

When it is desired to shift deck 24 from the fully extended position (shown in FIG. 3) to a fully retracted position (shown in FIG. 12), cable 122 can be decoupled from spring 114. Spring 114 can then be shifted into a stored position in torque element 116. Deck 24 can then be freely pivoted rearward on first pivot axis 74 until deck 24 is received generally between the laterally 10 spaced sides 36, 38 of frame 22 in a fully retracted position. It is preferred for deck 24 to be pivotable relative to frame 22 on first pivot axis 74 through a first pivot angle of more than about 20°, more preferably more than about 20°. Once in the fully retracted position, cable 122 can be run over a cable support 160 and coupled to cable anchor 138. Once cable 122 is coupled to cable anchor 138, winch 124 can be used to retract cable 122, thereby causing deck 24 to be pivoted upwards on second pivot axis 82 into a fully retracted transport storage position (shown in FIG. 12). Deck 24 can be held in a transport-storage position by a hook 162 coupled to frame 22.

Figure 14:
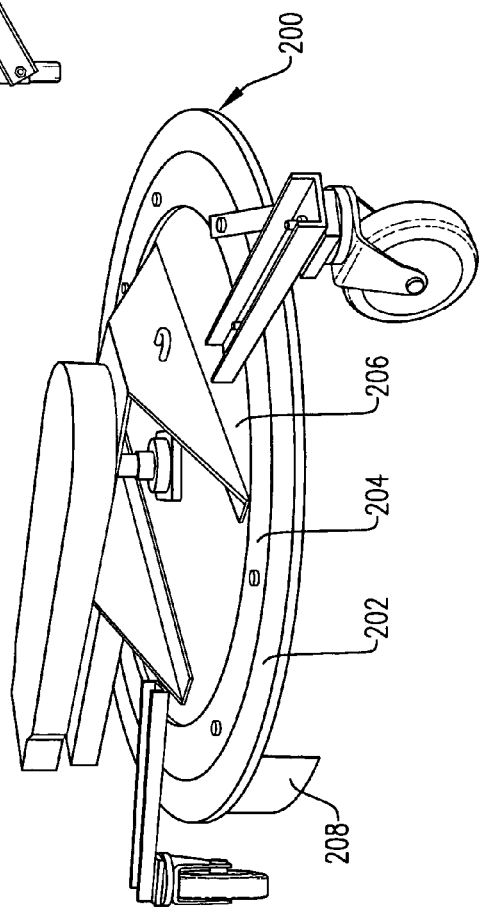
FIG. 14 is an isometric view of the mowing deck illustrated in FIG. 13.

Referring now to FIGS. 13 and 14, an alternative embodiment of mowing deck 200 is illustrated. Mowing deck 200 includes outer and inner concentric rings 202, 204. Outer and inner rings 202, 204 are rotatably coupled to one another so that rings 202, 204 can be rotated relative to one another on a common centrally positioned axis. Inner ring 204 is rigidly coupled to a body 206 of deck 200 via bolts or other attachment means. A skirt 208 is rigidly coupled to outer ring 202.

In operation, when deck 200 contacts a vertical obstruction 210, outer ring 202 frictionally engages obstruction 210 so that outer ring 202 rotates relative to inner ring 204 and body 206 as deck 200 is forced rearward by obstruction 210. This configuration reduces the friction between deck 200 and vertical obstruction 210 so that deck 200 can more easily swing relative to the mower frame when vertical obstruction 210 is being mowed around.

I claim:

1. A pull-behind mower for cutting ground vegetation, said mower configured to be pulled behind a vehicle and powered independently of the vehicle, said mower comprising:
   a frame presenting a fore end and an aft end:
   a hitch coupled to the fore end and configured to releasably couple the frame to the vehicle in a manner that permits pivoting of the frame relative to the vehicle;
   a pair of laterally spaced wheels coupled to the aft end and adapted to rollingly support the frame on the ground;
   a mowing deck operable to cut vegetation when positioned proximate the ground;
   a support arm comprising a frame-side section rotatably coupled to the frame and a deck-side section rigidly coupled to the deck, said frame-side and deck-side sections being hingedly intercoupled;
   a motor rigidly coupled to the frame and drivingly connected to the deck, so as to power the deck independently of the vehicle; and
   a drive train for transferring power from the motor to the deck,
   said drive train including a first rotatable drive shaft, a second rotatable drive shaft, and a U-joint coupled between the first and second drive shafts.

2. A mower according to claim 1,
   said support arm permitting pivoting of the deck relative to the frame on first and second distinct and intersecting pivot axes,
   said U-joint being centered proximate the intersection of the first and second pivot axes.

3. A mower according to claim 1,
   said frame-side section being rotatable relative to the frame on a first pivot axis,
   said frame-side and deck-side sections being hingedly intercoupled on a second pivot axes,
   said first and second pivot axes being substantially perpendicular to one another.

4. A mower according to claim 3,
   said first and second pivot axes intersecting one another.

5. A mower according to claim 4,
   said first pivot axis being generally upright.

6. A mower according to claim 3,
   a mechanism operable to inhibit pivoting of the deck on the second pivot axis.

7. A mower according to claim 3,
   said motor being a gas-powered motor.

8. A mower according to claim 1,
   said U-joint being a Hooke's joint.

9. A pull-behind mower for cutting ground vegetation, said mower configured to be pulled behind a vehicle, said mower comprising:
   a frame presenting a fore end and an aft end;
   a hitch coupled to the fore end and configured to releasably couple the frame to the vehicle in a manner that permits pivoting of the frame relative to the vehicle;
   a pair of laterally spaced wheels coupled to the aft end and adapted to rollingly support the frame on the ground;
   a mowing deck operable to cut vegetation when positioned proximate the ground;
   a support arm comprising a frame-side section rotatably coupled to the frame and a deck-side section rigidly coupled to the deck, said frame-side and deck-side sections being hingedly intercoupled;
   a motor rigidly coupled to the frame for powering the deck;
   a drive train for transferring power from the motor to the deck,
   said drive train including a first rotatable drive shaft, a second rotatable drive shaft, and a U-joint coupled between the first and second drive shafts,
   said frame-side section being rotatable relative to the frame on a first pivot axis,
   said frame-side and deck-side sections being hingedly intercoupled on a second pivot axes,
   said first and second pivot axes being substantially perpendicular to one another,
   said first pivot axis being generally upright; and
   a mechanism operable to inhibit pivoting of the deck on the second pivot axis;
   said mechanism being operable to selectively inhibit downward pivoting of the deck on the second pivot axis.

10. A mower according to claim 9,
    said first and second pivot axes intersecting one another.

11. A mower according to claim 10,
    said support arm permitting pivoting of the deck relative to the frame on the pivot axes,
    said U-joint being centered proximate the intersection of the first and second pivot axes.

12. A mower according to claim 9,
    said mechanism comprising a cable coupled to the frame and the deck.

13. A mower according to claim 9,
    said U-joint being a Hooke's joint.

14. A pull-behind mower for cutting ground vegetation, said mower configured to be pulled behind a vehicle, said mower comprising:
    a frame presenting a fore end and an aft end;
    a hitch coupled to the fore end and configured to releasably couple the frame to the vehicle in a manner that permits pivoting of the frame relative to the vehicle;
    a pair of laterally spaced wheels coupled to the aft end and adapted to rollingly support the frame on the ground;

a mowing deck operable to cut vegetation when positioned proximate the ground;

a support arm comprising a frame-side section rotatably coupled to the frame and a deck-side section rigidly coupled to the deck, said frame-side and deck-side sections being hingedly intercoupled;

a motor for powering the deck; and a drive train for transferring power from the motor to the deck;

said drive train including a first rotatable drive shaft, a second rotatable drive shaft, and a U-joint coupled between the first and second drive shafts, said motor being rigidly coupled to the frame so as to power the deck independently of the vehicle.

15. A mower according to claim 14,
said motor being a gas-powered motor.

16. A pull-behind mower for cutting ground vegetation, said mower comprising:

a frame adapted to be coupled to a vehicle and rollingly supported on the ground;

a motor rigidly coupled to the frame;

a mowing deck coupled to the frame for pivotal movement relative to the frame on first and second intersecting pivot axes;

a drive train for drivingly coupling the motor to the deck so that the motor powers the deck;

said drive train including a first rotatable drive shaft, a second rotatable drive shaft, and a U-joint coupled between the first and second drive shafts for rotation therewith, said U-joint being centered proximate the intersection of the first and second pivot axes.

said deck being pivotable relative to the frame on the first pivot axis between a retracted position and an extended position, said deck being pivotable relative to the frame on the second pivot axis between an engaged position and a disengaged position, said first and second pivot axes being at least substantially perpendicular to one another, said first pivot axis being generally upright; and a mechanism operable to inhibit pivoting of the deck on the second pivot axis; and said mechanism being operable to selectively inhibit downward pivoting of the deck on the second pivot axis.

17. A mower according to claim 16,
said mechanism comprising a cable coupled to the frame and the deck.

* * * * *